(12) United States Patent
Taljaard (10) Patent No.: US 11,840,195 B2
(45) Date of Patent: Dec. 12, 2023

(54) RETRO-FITTABLE VEHICLE LOCK

(71) Applicant: HARDCORE AUTOMOTIVE LOCKING TECHNOLOGIES (PTY) LTD, Nelspruit (ZA)

(72) Inventor: Philippus Petrus Erasmus Taljaard, Nelspruit (ZA)

(73) Assignee: HARDCORE AUTOMOTIVE LOCKING TECHNOLOGIES (PTY) LTD, Nelspruit (ZA)

( * ) Notice: Subject to any disclaimer, the term of this patent is extended or adjusted under 35 U.S.C. 154(b) by 530 days.

(21) Appl. No.: 17/257,647

(22) PCT Filed: Jul. 5, 2018

(86) PCT No.: PCT/IB2018/054959
§ 371 (c)(1),
(2) Date: Jan. 4, 2021

(87) PCT Pub. No.: WO2020/008234
PCT Pub. Date: Jan. 9, 2020

(65) Prior Publication Data
US 2021/0122331 A1    Apr. 29, 2021

(51) Int. Cl.
*B60R 25/06* (2006.01)
*F16H 63/34* (2006.01)
(Continued)

(52) U.S. Cl.
CPC ......... *B60R 25/06* (2013.01); *F16H 63/3408* (2013.01); *F16H 63/36* (2013.01); *B60R 2025/0415* (2013.01)

(58) Field of Classification Search
CPC ......... B60R 25/06; B60R 25/04; B60R 25/00; B60R 2025/0415; F16H 63/34; F16H 63/3408; F16H 63/36
See application file for complete search history.

(56) References Cited

U.S. PATENT DOCUMENTS

| 2,992,693 A | | 7/1961 | Peyton |
| 5,020,344 A | * | 6/1991 | Garcia ..................... B60R 25/06 |
| | | | 70/255 |

(Continued)

FOREIGN PATENT DOCUMENTS

| WO | WO 2017/006008 | 1/2017 |
| WO | WO 2018/001476 | 1/2018 |
| WO | WO 2018/042236 | 3/2018 |

OTHER PUBLICATIONS

International Search Report and Written Opinion for International (PCT) Patent Application No. PCT/IB2018/054959, dated Oct. 4, 2018, 8 pages.

*Primary Examiner* — Paul N Dickson
*Assistant Examiner* — Caitlin Anne Miller
(74) *Attorney, Agent, or Firm* — Sheridan Ross P.C.

(57) ABSTRACT

The invention relates to a driveshaft lock (10) and to a method (50) of retrofitting the driveshaft lock to a vehicle. The driveshaft lock (10) includes a rotor (17) which defines a star-shaped central aperture (20) which is configured to receive a non-circular, peripheral profile of a drive flange (13) therethrough such that the rotor (17) is configured to piggyback on the drive flange (13). The lock (10) includes a locking member (21) which is configured selectively to engage the rotor (17) in order to lock the rotor in position and prevent angular displacement thereof. Amongst other steps, the method (50) includes aligning the aperture (20) of the rotor with the profile of the drive flange, passing the rotor over the drive flange, rotating the rotor relative to the drive flange, and securing the rotor to the drive flange for rotation together with the drive flange, piggyback-style.

20 Claims, 10 Drawing Sheets

(51) Int. Cl.
  *F16H 63/36* (2006.01)
  *B60R 25/04* (2013.01)

(56) References Cited

U.S. PATENT DOCUMENTS

| | | | | |
|---|---|---|---|---|
| 8,132,480 | B2* | 3/2012 | Allen | F04C 15/008 |
| | | | | 74/462 |
| 9,260,886 | B2* | 2/2016 | Myers | E05B 47/026 |
| 10,502,318 | B2* | 12/2019 | Newman | F16H 63/3491 |
| 10,876,628 | B2* | 12/2020 | Gruber | B60K 1/00 |
| 2005/0155824 | A1* | 7/2005 | Taba | B62B 5/0423 |
| | | | | 340/568.5 |
| 2019/0202403 | A1* | 7/2019 | Taljaard | B60R 25/20 |
| 2020/0114753 | A1* | 4/2020 | Biderman | H02P 6/08 |

* cited by examiner

RETRO-FITTABLE VEHICLE LOCK

CROSS REFERENCE TO RELATED APPLICATIONS

This application is a national stage application under 35 U.S.C. 371 and claims the benefit of PCT Application No. PCT/IB2018/054959 having an international filing date of 5 Jul. 2018, which designated the United States, the entire disclosure of is incorporated herein by reference.

FIELD OF INVENTION

This invention relates to vehicle security. More specifically, it relates to a vehicle driveshaft lock which is configured to be retrofitted to a vehicle.

BACKGROUND OF INVENTION

All new vehicles come standard with some form of vehicle security or alarm system which usually comprises a central door locking system operated using a remote control. Modern vehicles usually also include some form of electronic immobiliser which disables certain functions of the vehicle in order to prevent unauthorised use of the vehicle. Despite these measures being in place, thieves often still manage to find ways of bypassing or circumventing these standard, manufacturer-specified vehicle safety measures.

Accordingly, innovators have tried to come up with innovative after-market security solutions in order to fortify vehicles against theft. These innovations include gear locks, steering or pedal locks, tracking devices, and electronic immobilisers, just to name a few. A drawback associated with after-market innovations is that, in many instances, fairly drastic or significant alterations have to be made to the vehicle in order to retrofit these security devices. Inevitably, as time passes, weaknesses with these devices are identified and exploited by thieves. For example, weaknesses associated with existing devices may include ease of tampering with the device, ability to interrupt power to the device, ability to bypass the device completely, or, in worst case scenarios, ability to tow away the vehicle, despite the presence of a properly functioning security device to a remote location where the device can be effectively disarmed and/or removed.

It is an object of the invention to provide a vehicle lock and a method of retrofitting a vehicle lock which address or at least alleviate the drawbacks discussed above.

SUMMARY OF INVENTION

In accordance with a first aspect of the invention, there is provided a method of retrofitting a driveshaft lock to a vehicle, the driveshaft lock including:
 a rotor which defines a central aperture which is configured to receive a non-circular, peripheral profile of a drive flange of a driveshaft therethrough such that the rotor is configured to piggyback on the drive flange;
 a locking member which is configured selectively to engage the rotor in order to lock the rotor in position and prevent angular displacement thereof;
the method including:
 aligning the central aperture of the rotor with the non-circular peripheral profile of the drive flange;
 passing the rotor over the drive flange;
 rotating the rotor relative to the drive flange so that the central aperture is out of register with the non-circular peripheral profile of the drive flange; and
 securing the rotor to the drive flange for rotation together with the drive flange, piggyback-style, about a drive axis.

The method may include the prior step of disconnecting a driveshaft coupling from the drive flange.

The method may include mounting the locking member adjacent to the rotor, the driveshaft lock further including an actuator which is configured to displace the locking member relative to the rotor between an open position in which the locking member is spaced away from the rotor and the rotor is permitted to rotate freely about the drive axis and a locked position in which the locking member engages the rotor and prevents rotation of the rotor about the drive axis.

The method may include mounting a tamperproof casing to a transmission housing of the vehicle and enclosing the locking member and actuator within the tamperproof casing.

The aligning step may include coaxially and angularly aligning the rotor with the drive flange such that the non-circular peripheral profile of the drive flange is in register with the central aperture of the rotor.

The passing over step may include axially displacing the rotor relative to and over the drive flange such that the drive flange passes through the central aperture.

The rotating step may include angularly displacing the rotor relative to the drive flange until mounting formations of the rotor are in register with corresponding mounting holes of the drive flange. Furthermore, the rotating step may include angularly displacing the rotor relative to the drive flange by 45°.

The method may include at least partially enclosing the rotor which a guard.

The central aperture may be star-shaped.

In accordance with a second aspect of the invention, there is provided a driveshaft lock rotor which includes:
 a body defining a central aperture which is configured to receive a non-circular, peripheral profile of a drive flange therethrough, the body further defining a plurality of mounting formations for securing the rotor to the drive flange, once the rotor has passed over the drive flange and has been angularly displaced relative to the drive flange, for rotation together with the drive flange, the central aperture and mounting formations rendering the rotor retrofittable to a driveshaft of a vehicle, piggyback-style, wherein the body is configured to mate with a locking member in a locked position in which the locking member prevents angular displacement of the rotor.

The mounting formations may be configured such that the body of the rotor is coaxially secured to the drive flange. The rotor body may be disc-shaped. An outer periphery of the body may resemble a toothed gear. The central aperture may be substantially star-shaped.

The plurality of mounting formations may include four circular openings which are equiangularly spaced apart and correspond to mounting holes of the drive flange.

In accordance with another aspect of the invention, there is provided a driveshaft lock which is retrofittable to a driveshaft of a vehicle, the driveshaft lock including:
 a rotor which includes a body which defines a central aperture which is configured to receive a non-circular, peripheral profile of a drive flange therethrough, the body further defining a plurality of mounting formations for securing the rotor to the drive flange, once the rotor has passed over the drive flange and has been angularly displaced relative to the drive flange, for rotation together with the drive flange, the central aperture and mounting formations rendering the rotor retrofittable to the driveshaft, piggyback-style;

a locking member operatively mounted adjacent to the rotor and configured to engage the rotor, when in a locked position; and an actuator which is drivingly connected to the locking member and is configured to displace the locking member between an open position, in which the rotor is free to rotate together with the drive flange about a drive axis, and the locked position, in which the locking member engages the rotor and prevents angular displacement of the rotor about the drive axis.

The locking member may include a locking pawl which is pivotally connected to the vehicle and is configured to engage a toothed outer peripheral profile of the body of the rotor when in its locked position. The actuator may include a motor and an extendable actuating arm. The motor may be connected to the actuating arm.

The actuating arm may include:

a screw rod which is connected to the motor;

a sleeve which is connected to the locking member; and a screw-follower which is screw-threadingly mounted to the screw rod, the screw-follower including a key which is received in a keyway of the sleeve such that rotation of the screw rod is translated into linear displacement of the screw-follower, and hence, linear displacement of the sleeve, which, in turn, results in pivotal displacement of the locking member.

The actuating arm may further include at least one biasing member connected between the screw-follower and the sleeve, the biasing member being configured to bias the locking member to one of its open or locked positions.

More specifically, the actuating arm may include two biasing members connected between the sleeve and the screw-follower, one biasing member being connected either side of the screw-follower and being configured to bias the locking member to one of its open or locked positions.

The locking member and actuator may be housed within a tamperproof casing which is retro-fitted to the vehicle.

BRIEF DESCRIPTION OF DRAWINGS

The invention will now be further described, by way of example, with reference to the accompanying drawings.

In the drawings.

DETAILED DESCRIPTION OF AN EXAMPLE EMBODIMENT

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

In the figures, reference numeral 10 refers generally to a driveshaft lock in accordance with one aspect of the invention. The driveshaft lock 10 is configured to be retrofitted to a factory-assembled driveshaft of a vehicle in order to lock the driveshaft in position by preventing rotation of the driveshaft, and hence, preventing unauthorised use of the vehicle, e.g. vehicle theft. In the figures, only part of the existing vehicle driveshaft has been illustrated.

Figure 1:
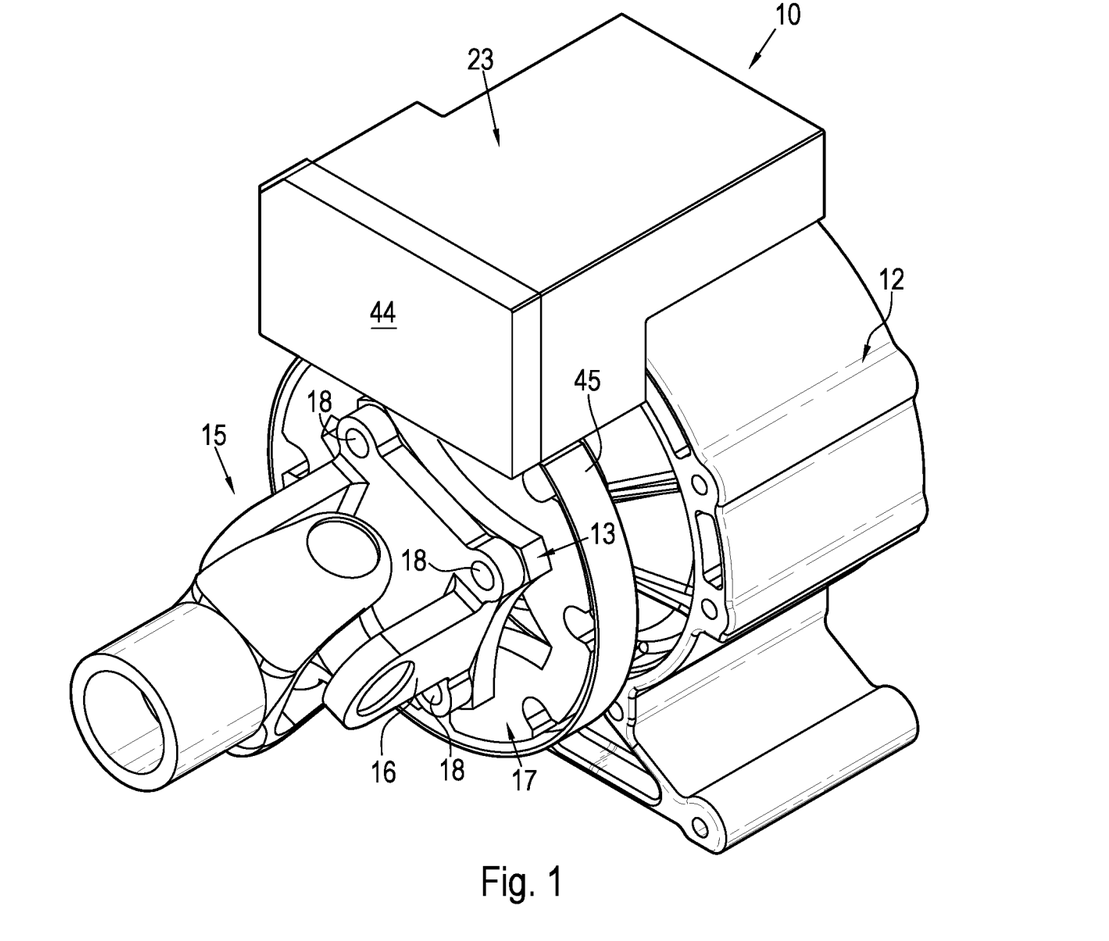
FIG. 1 shows a three-dimensional view of a driveshaft lock, in accordance with one aspect of the invention, mounted to a driveshaft of a vehicle.
Figure 2:
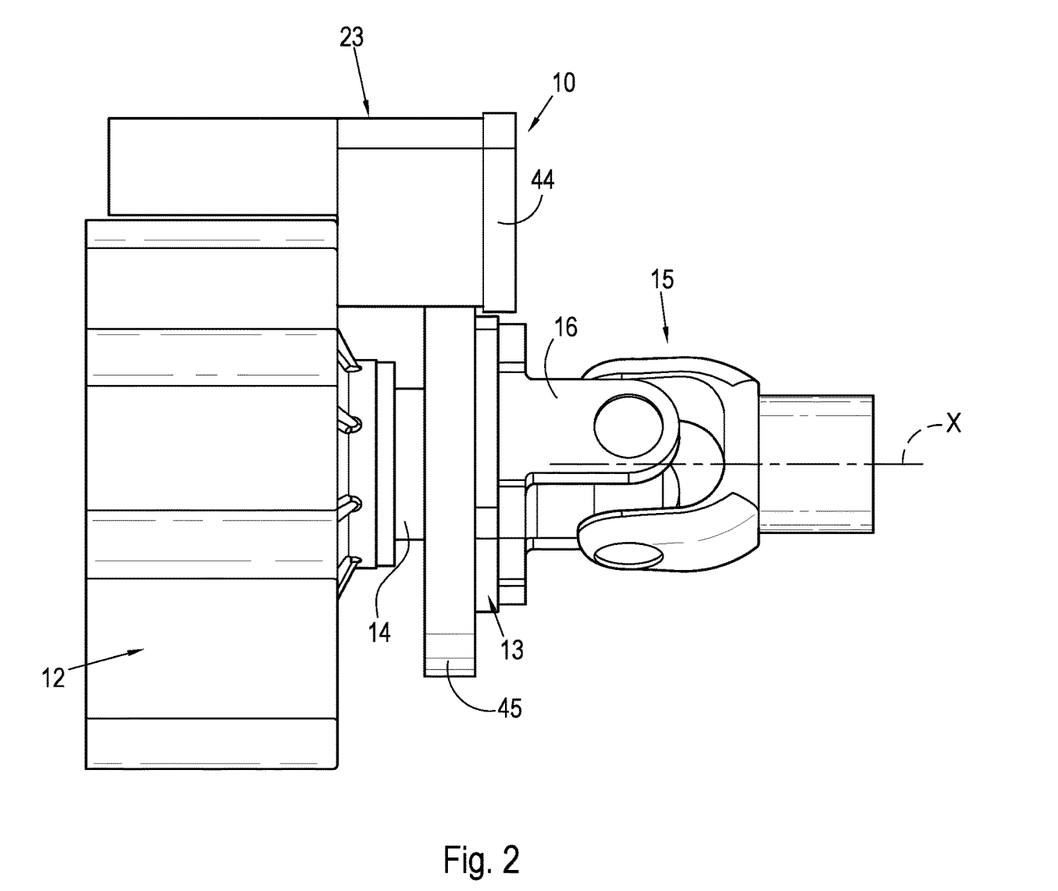
FIG. 2 shows a left side view of the driveshaft lock of FIG. 1.

Part of the driveshaft which has been illustrated includes a transmission housing 12 and a drive flange 13 which protrudes axially from the transmission housing 12 by means of a shaft 14 (see FIG. 2) and is configured for rotation about a drive axis X when power is transmitted to the driveshaft from a powerplant or engine (not shown). A propeller shaft is connected to the drive flange 13 and, in this example embodiment, includes a universal joint 15, as shown in the figures, which is operatively secured to the drive flange 13 using conventional fasteners such as bolts and nuts or screws (not shown). To this end, a flange yoke 16 of the universal joint 15 has four mounting holes 18 which correspond with mounting holes 9 formed on the drive flange 13 to ensure that the flange yoke 16 is secured to the drive flange 13 for rotation about the drive axis X.

Naturally, in order to retrofit the driveshaft lock 10, parts of the driveshaft lock 10 have to be mounted to, or at least mounted adjacent to, the driveshaft of the vehicle. If a component, or part of the driveshaft lock 10 were to be introduced to the driveshaft in in-line fashion, it would effectively result in lengthening of the driveshaft which would necessitate modification to the existing driveshaft in order to shorten it to its prior length to ensure correct installation and operation. For this reason, it will be appreciated that it is undesirable to introduce parts to the driveshaft in in-line fashion, for example, by sandwiching a part between the flange yoke 16 of the universal joint 15 and the drive flange 13, because it will result in lengthening of the driveshaft. Therefore, the Applicant has designed a piggyback-style retrofittable driveshaft lock 10.

Figure 3:
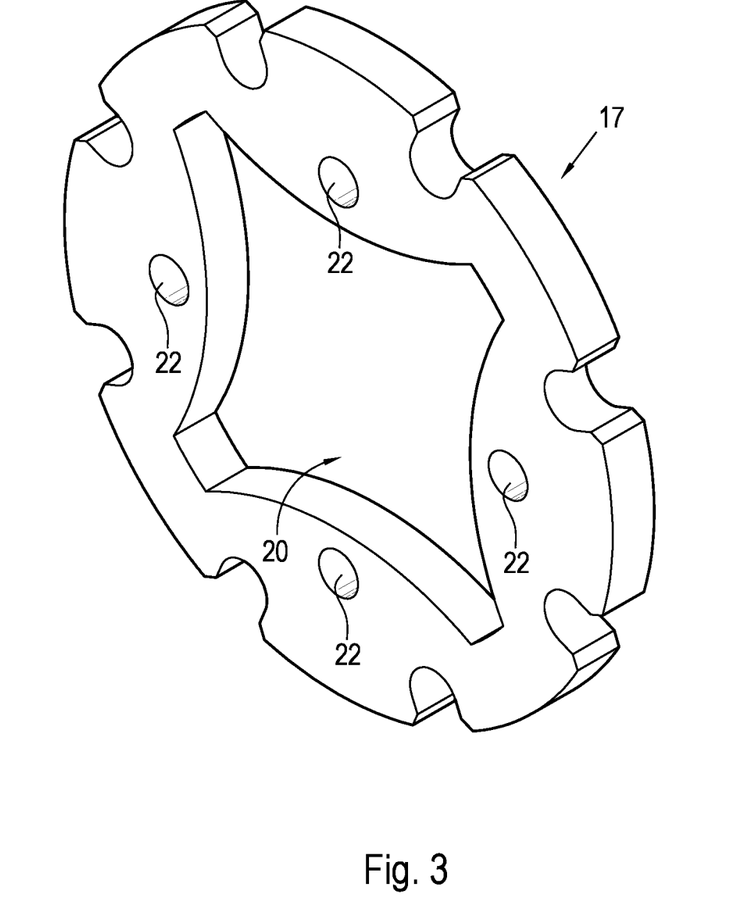
FIG. 3 shows a three-dimensional view of a driveshaft lock rotor, in accordance with another aspect of the invention, which forms part of the driveshaft lock.

The driveshaft lock 10 includes a rotor 17, in accordance with another aspect of the invention, which includes a disc-shaped body which defines a central, substantially star-shaped aperture 20 which is configured to receive the non-circular, peripheral profile of the drive flange 13 therethrough. As can be seen from the figures, particularly FIG. 4, the drive flange 13 has an outer peripheral profile which corresponds substantially with the central aperture 20. With reference to FIG. 3, the body of the rotor 17 further defines a plurality of mounting formations 22 in the form of four equiangularly spaced apart circular openings for securing the rotor 17 to the drive flange 13 for rotation together with the drive flange about the drive axis X. The central aperture 20 and mounting formations 22 of the rotor 17 render the rotor retrofittable to the driveshaft, piggyback-style, as will be explained below.

Figure 4:
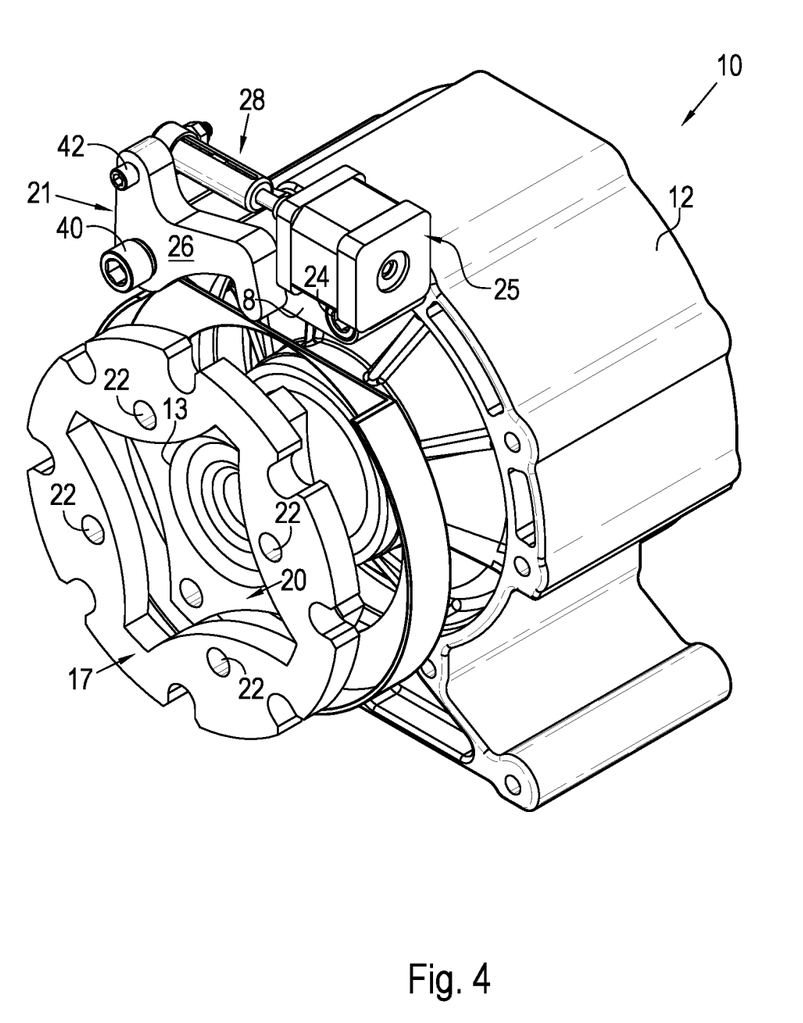
FIG. 4 shows a three-dimensional view of a partially assembled driveshaft lock, the rotor being disconnected.
Figure 5:
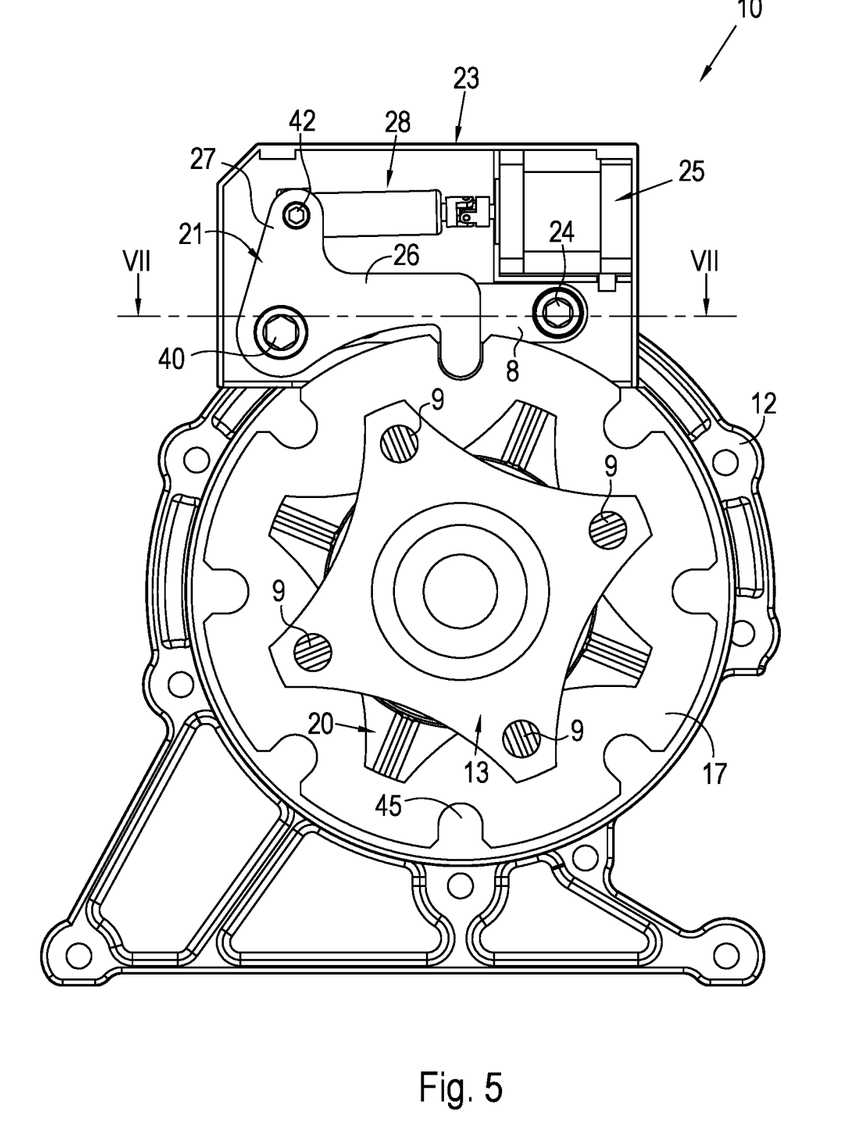
FIG. 5 shows an axial end view of the driveshaft lock of FIG. 4 with the rotor connected and a locking pawl in its locked position.
Figure 6:
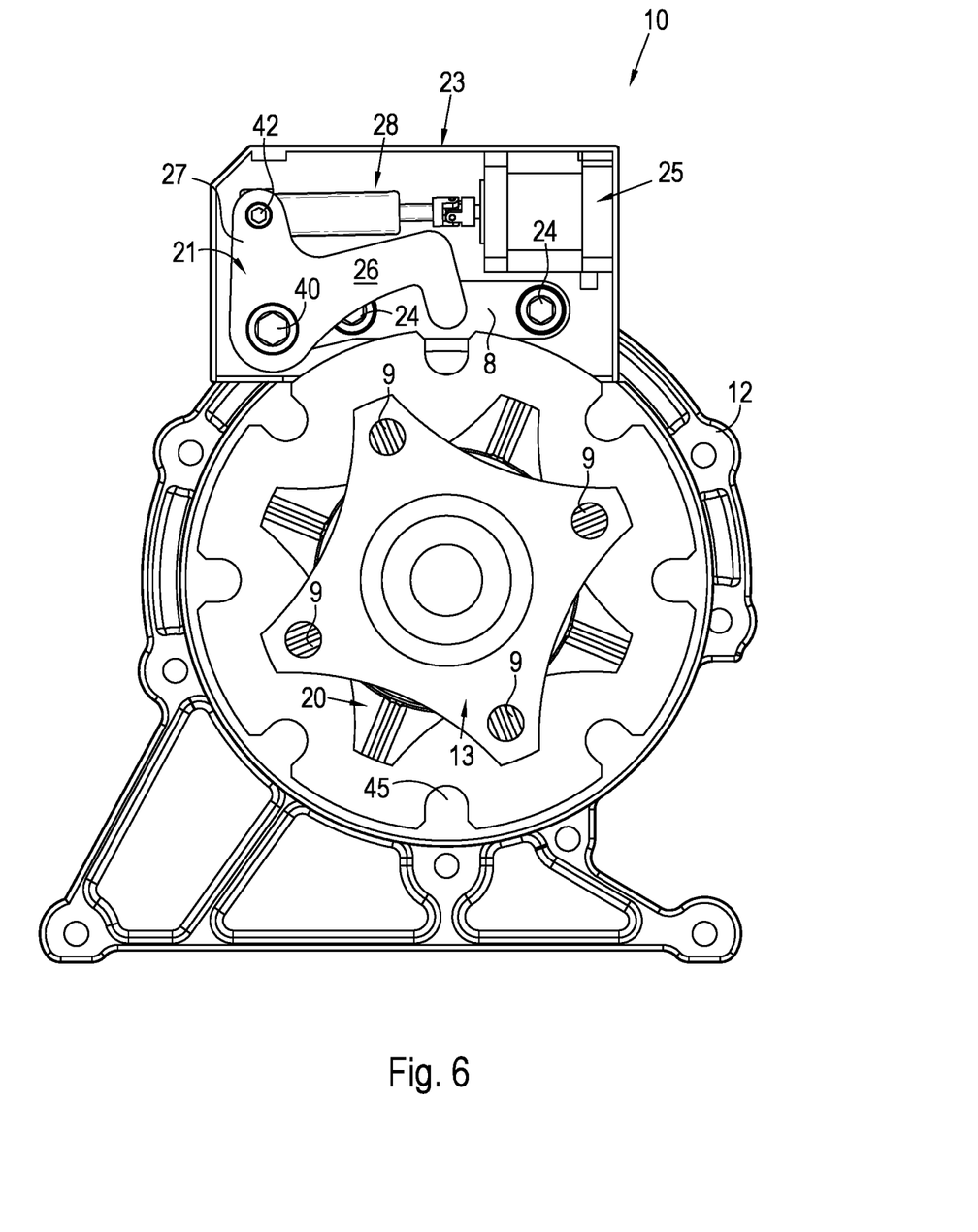
FIG. 6 shows the driveshaft lock of FIG. 5 with the locking pawl in its open position.

With reference to FIGS. 4 to 6, the driveshaft lock 10 further includes a locking member 21 which is operatively spaced from the transmission casing 12 through use of a spacer 8 and is pivotally mounted to the spacer 8, adjacent to the rotor 17, by way of a pin 40 which screws into the spacer 8. When in a locked position, the locking member 21 is configured to engage the rotor 17 and to prevent rotation of the rotor 17 and hence the driveshaft. The lock 10 further includes an actuator 25 which is drivingly connected to the locking member 21 and is configured pivotally to displace the locking member 21 about the pin 40 between an open position (FIG. 6), in which the locking member 21 is spaced away from the rotor 17 and the rotor 17 is free to rotate together with the drive flange 13 about the drive axis X, and the locked position (FIG. 5), in which the locking member 21 engages the rotor 17 and prevents angular displacement of the rotor 17 about the drive axis X.

Figure 7:
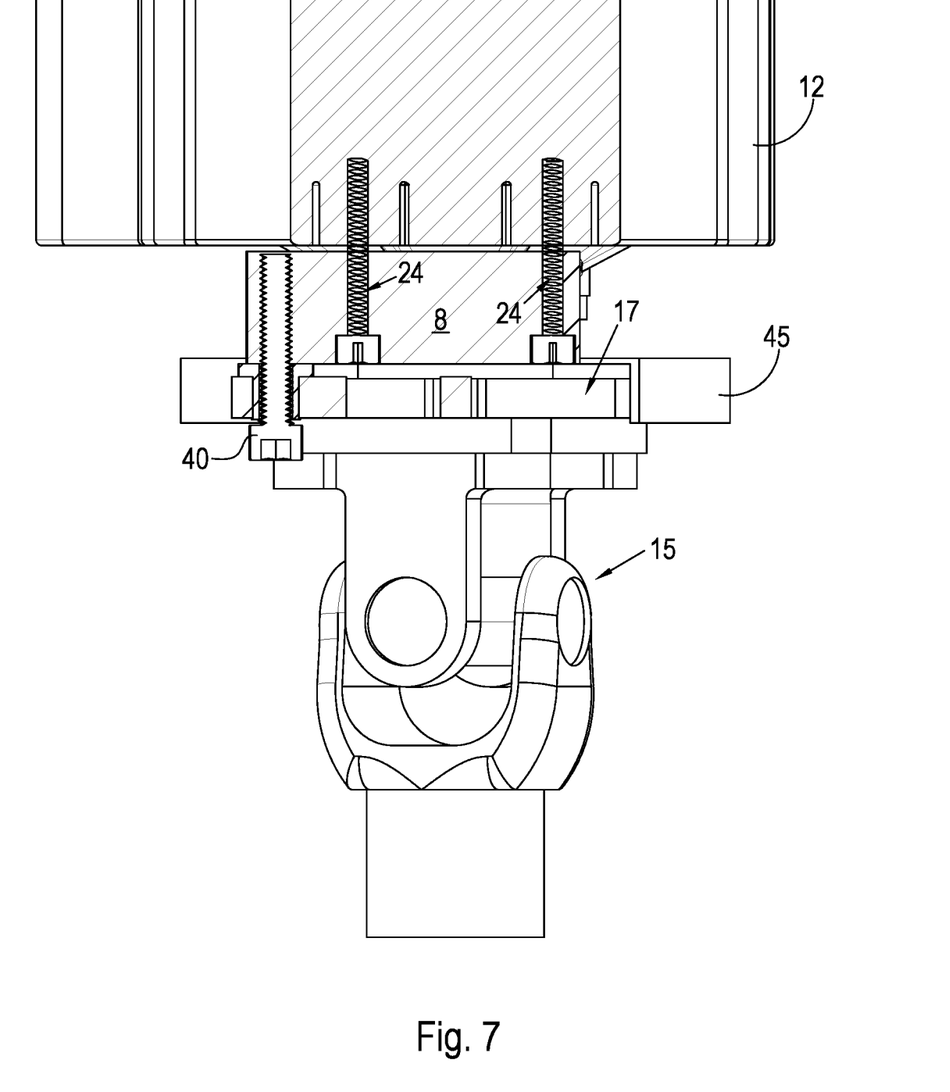
FIG. 7 shows an axial cross-sectional view of the driveshaft lock of FIG. 5 taken along lines VII-VII.

The locking member 21 and actuator 25, amongst other components which have not all been illustrated in the figures and which include a central processing unit, a wireless communication module, a tracking device, a GSM modem and a battery as back-up power source to power the driveshaft lock 10, are housed within a tamperproof casing 23 which is operatively mounted to the transmission housing 12 using two bolts 24 (see FIG. 7) which pass through the spacer 8 and screw into the transmission housing 12. The locking member 21 includes a locking pawl 26 and a control arm 27 which protrudes from the locking pawl 26 and is operatively pivotally connected to an extendable actuating arm 28 of the actuator 25 by way of a pin 42. The locking pawl 26 is roughly L-shaped and is configured to engage or mate with a toothed, outer peripheral profile of the body of the rotor 17, when in its locked position (see FIG. 5).

Figure 8:
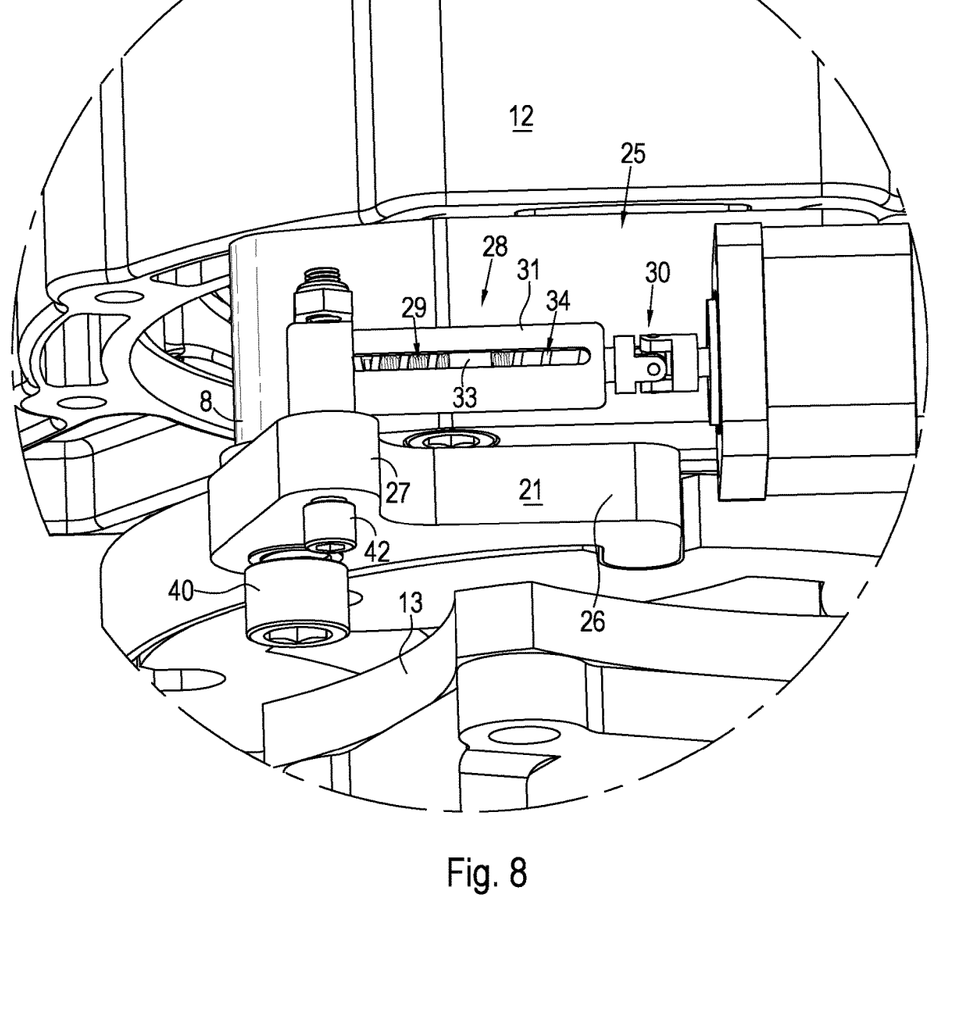
FIGS. 8 and 9 show detailed views of an actuator and locking member of the driveshaft lock.
Figure 9:
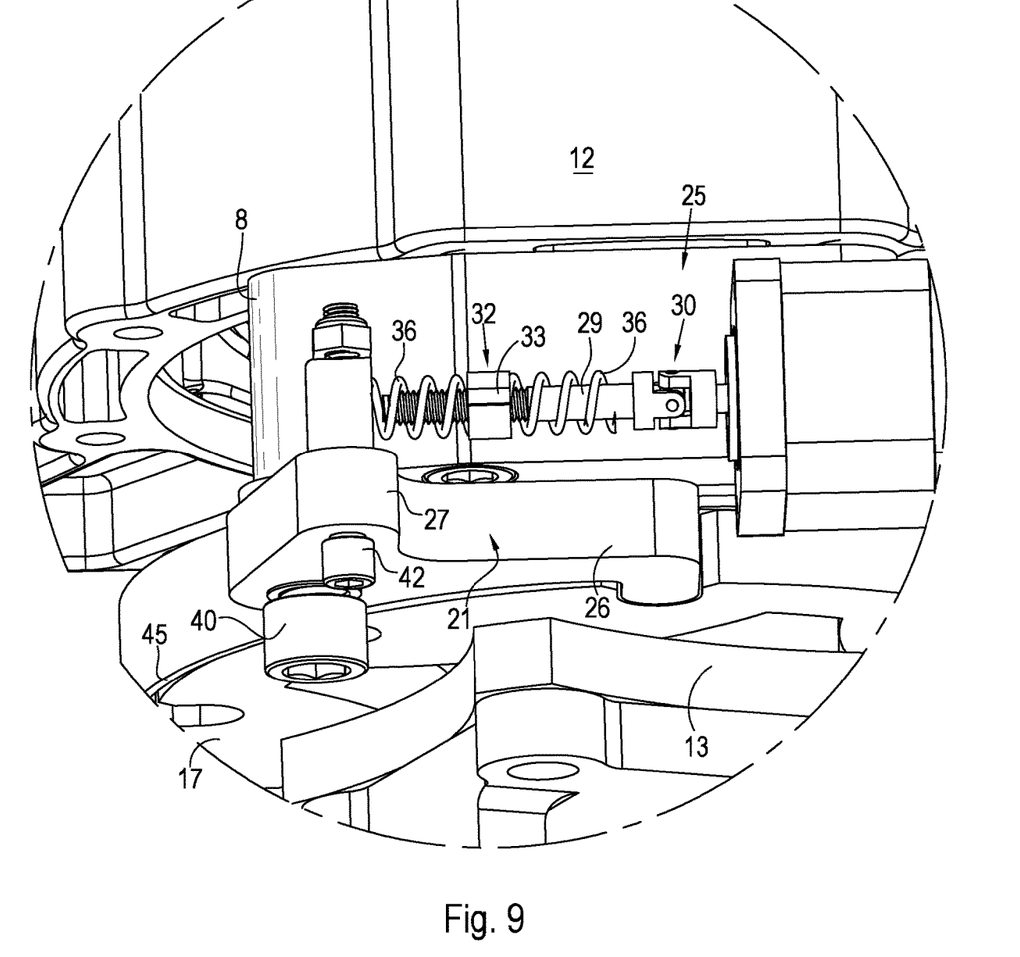

Referring now to FIGS. 8 and 9, the actuator 25 includes an electric motor which is drivingly connected to the actuating arm 28. The actuating arm 28 includes a screw rod 29 which is connected to the electric motor via a universal joint coupling 30, a sleeve 31 which is pivotally connected to the control arm 27 of the locking member 21 via the pin 42, and a screw-follower 32 which is screw-threadingly mounted to the screw rod 29. The screw-follower 32 includes a protruding key 33 which is received in a keyway 34 of the sleeve 31 such that rotation of the screw rod 29 is translated into linear displacement of the screw-follower 32, and hence, linear displacement of the sleeve 31 which, in turn, results in pivotal displacement of the locking member 21 about pin 40.

The actuating arm 28 further includes two biasing members in the form of coil springs 36 connected between ends of the sleeve 31 and the screw-follower 32, one coil spring 36 being connected either side of the screw-follower 32. As the screw-follower translates up and down the screw rod 29, each coil spring serves to bias the sleeve 31 and hence the locking member 21 to one of its open or locked positions.

Figure 10:
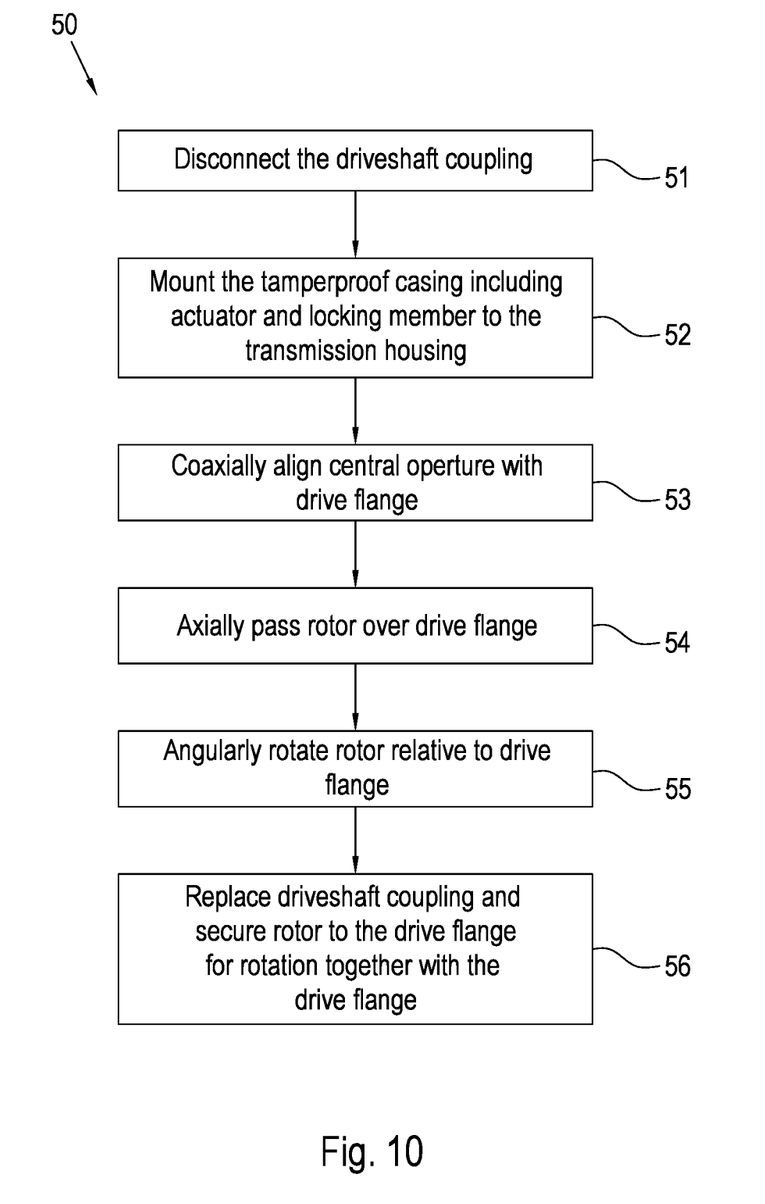
FIG. 10 shows a flow diagram of a method of retrofitting the driveshaft lock to the vehicle in accordance with another aspect of the invention.

Reference is now made to FIG. 10 which shows a method 50 of retrofitting the driveshaft lock 10, and more specifically the driveshaft lock rotor 17, to the vehicle driveshaft. As explained above, due to the star-shaped central aperture 20, the rotor 17 is configured to piggyback on the drive flange 13. Accordingly, in order to mount the lock 10 and retrofit the rotor 17, an installer disconnects 51 a driveshaft coupling, i.e. the universal joint 15 from the drive flange 13 and withdraws the universal joint 15. This leaves the drive flange 13 exposed as shown in FIG. 4. The tamperproof casing 23 which houses the actuator 25 and locking member 21, amongst other components, and has an L-shaped body in side view, is then mounted 52 to the transmission housing 12 via the two bolts 24 which pass through openings in the spacer 8 and the L-shaped body and screw into screw-threaded holes in the housing 12. The casing 23 also has a lid or cover 44 which is secured to the L-shaped body in order to close an open end of the L-shaped body. Furthermore, a circular cylindrical rotor guard 45 is irrotationally joined to the casing 23.

With the tamperproof casing 23 and rotor guard 45 in place, the installer then coaxially aligns 53 the central aperture 20 of the rotor 17 such that it is in register with the star-shaped profile of the drive flange 13. The rotor 17 is then axially slid 54 over the drive flange 13 by allowing the drive flange 13 to pass through the central aperture 20. The rotor 17 is then angularly displaced 55 relative to the drive flange 13 through 45 degrees (see FIG. 5) until the mounting formations 22 of the rotor 17 are in register with the mounting holes 9 of the drive flange 13. The installer then replaces the flange yoke 16 of the universal joint 15 in position over the drive flange 13 and secures 56 the rotor 17 to the drive flange 13 for rotation together with the drive flange 13, piggyback-style, about the drive axis X by securing the fasteners through the registering holes of the flange yoke, drive flange 13 and rotor 17. Special lock nuts (not shown) that require the use of a key to undo are used to prevent unauthorised disassembly of the lock 10.

Once fitted as explained above, a remote-control device (not shown) and/or a mobile communication device such as a mobile phone (not shown) are used to lock/unlock the driveshaft lock 10 by actuating the actuator 25 in order to displace the locking member 21 between its open and locked positions. The Applicant believes that the driveshaft lock 10 will provide an effective solution to curb vehicle theft and retrofitting the lock 10 is relatively easy to do with almost no modification required to be made to the vehicle itself. Because the lock 10 engages the driveshaft directly and is enclosed in a tamperproof casing, it cannot be easily bypassed or tampered with.

The invention claimed is:

1. A method of retrofitting a driveshaft lock to a vehicle, the driveshaft lock including:
   a rotor which defines a central aperture which is configured to receive a non-circular, peripheral profile of a drive flange of a driveshaft therethrough such that the rotor is configured to piggyback on the drive flange;
   a locking member which is configured selectively to engage the rotor in order to lock the rotor in position and prevent angular displacement thereof;
   the method including:
      aligning the central aperture of the rotor with the non-circular peripheral profile of the drive flange;
      passing the rotor over the drive flange;
      rotating the rotor relative to the drive flange so that the central aperture is out of register with the non-circular peripheral profile of the drive flange; and
      securing the rotor to the drive flange for rotation together with the drive flange, piggyback-style, about a drive axis.

2. The method as claimed in claim 1, which includes the prior step of disconnecting a driveshaft coupling from the drive flange.

3. The method as claimed in claim 1, which includes mounting the locking member adjacent to the rotor, the driveshaft lock further including an actuator which is configured to displace the locking member relative to the rotor between an open position in which the locking member is spaced away from the rotor and the rotor is permitted to rotate freely about the drive axis and a locked position in which the locking member engages the rotor and prevents rotation of the rotor about the drive axis.

4. The method as claimed in claim 3, which includes mounting a tamperproof casing to a transmission housing of the vehicle and enclosing the locking member and actuator within the tamperproof casing.

5. The method as claimed in claim 1, wherein the aligning step includes coaxially and angularly aligning the rotor with the drive flange such that the non-circular peripheral profile of the drive flange is in register with the central aperture of the rotor.

6. The method as claimed in claim 5, wherein the passing over step includes axially displacing the rotor relative to and over the drive flange such that the drive flange passes through the central aperture.

7. The method as claimed in claim 6, wherein the rotating step includes angularly displacing the rotor relative to the drive flange until mounting formations of the rotor are in register with corresponding mounting holes of the drive flange.

8. The method as claimed in claim 7, wherein the rotating step includes angularly displacing the rotor relative to the drive flange by 45°.

9. The method as claimed in claim 1, which includes at least partially enclosing the rotor with a guard.

10. The method as claimed in claim 1, wherein the central aperture is star-shaped.

11. A driveshaft lock rotor which includes:
a body defining a central aperture which is configured to receive a non-circular, peripheral profile of a drive flange therethrough, the body further defining a plurality of mounting formations for securing the rotor to the drive flange, once the rotor has passed over the drive flange and has been angularly displaced relative to the drive flange, for rotation together with the drive flange, the central aperture and mounting formations rendering the rotor retrofittable to a driveshaft of a vehicle, piggyback-style, wherein the body is configured to mate with a locking member in a locked position in which the locking member prevents angular displacement of the rotor.

12. The driveshaft lock rotor as claimed in claim 11, wherein the mounting formations are configured such that the body of the rotor is coaxially secured to the drive flange.

13. The driveshaft lock rotor as claimed in claim 11, wherein the body is disc-shaped, an outer periphery of the body resembles a toothed gear and the central aperture is substantially star-shaped.

14. The driveshaft lock rotor as claimed in claim 13, wherein the plurality of mounting formations includes four circular openings which are equiangularly spaced apart and correspond to mounting holes of the drive flange.

15. A driveshaft lock which is retrofittable to a driveshaft of a vehicle, the driveshaft lock including:
a rotor which includes a body which defines a central aperture which is configured to receive a non-circular, peripheral profile of a drive flange therethrough, the body further defining a plurality of mounting formations for securing the rotor to the drive flange, once the rotor has passed over the drive flange and has been angularly displaced relative to the drive flange, for rotation together with the drive flange, the central aperture and mounting formations rendering the rotor retrofittable to the driveshaft, piggyback-style;
a locking member operatively mounted adjacent to the rotor and configured to engage the rotor, when in a locked position; and
an actuator which is drivingly connected to the locking member and is configured to displace the locking member between an open position, in which the rotor is free to rotate together with the drive flange about a drive axis, and the locked position, in which the locking member engages the rotor and prevents angular displacement of the rotor about the drive axis.

16. A driveshaft lock as claimed in claim 15, wherein the locking member includes a locking pawl which is pivotally connected to the vehicle and is configured to engage a toothed outer peripheral profile of the body of the rotor when in its locked position, and wherein the actuator includes a motor and an extendable actuating arm, the motor being connected to the actuating arm.

17. A driveshaft lock as claimed in claim 16, wherein the actuating arm includes:
a screw rod which is connected to the motor;
a sleeve which is connected to the locking member; and
a screw-follower which is screw-threadingly mounted to the screw rod, the screw-follower including a key which is received in a keyway of the sleeve such that rotation of the screw rod is translated into linear displacement of the screw-follower, and hence, linear displacement of the sleeve, which, in turn, results in pivotal displacement of the locking member.

18. A driveshaft lock as claimed in claim 17, wherein the actuating arm further includes at least one biasing member connected between the screw-follower and the sleeve, the biasing member being configured to bias the locking member to one of its open or locked positions.

19. A driveshaft lock as claimed in claim 18, wherein the actuating arm includes two biasing members connected between the sleeve and the screw-follower, one biasing member being connected either side of the screw-follower and being configured to bias the locking member to one of its open or locked positions.

20. A driveshaft lock as claimed in claim 15, wherein the locking member and actuator are housed within a tamperproof casing which is retro-fitted to the vehicle.

\* \* \* \* \*